(12) United States Patent
Park et al.

(10) Patent No.: US 10,964,972 B2
(45) Date of Patent: Mar. 30, 2021

(54) LITHIUM-RICH ANTIPEROVSKITE-COATED LCO-BASED LITHIUM COMPOSITE, METHOD FOR PREPARING SAME, AND POSITIVE ELECTRODE ACTIVE MATERIAL AND LITHIUM SECONDARY BATTERY COMPRISING SAME

(71) Applicant: LG CHEM, LTD., Seoul (KR)

(72) Inventors: Se Ho Park, Daejeon (KR); Da Young Sung, Daejeon (KR); Minchul Jang, Daejeon (KR); Byoungkuk Son, Daejeon (KR); Junghun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 40 days.

(21) Appl. No.: 16/093,533

(22) PCT Filed: Sep. 15, 2017

(86) PCT No.: PCT/KR2017/010141
§ 371 (c)(1),
(2) Date: Oct. 12, 2018

(87) PCT Pub. No.: WO2018/056650
PCT Pub. Date: Mar. 29, 2018

(65) Prior Publication Data
US 2019/0131651 A1    May 2, 2019

(30) Foreign Application Priority Data
Sep. 23, 2016 (KR) .................. 10-2016-0122465

(51) Int. Cl.
| | |
|---|---|
| *H01M 10/052* | (2010.01) |
| *H01M 4/525* | (2010.01) |
| *H01M 4/36* | (2006.01) |
| *C01G 51/00* | (2006.01) |
| *H01M 10/0525* | (2010.01) |
| *H01M 4/1315* | (2010.01) |
| *H01M 4/13915* | (2010.01) |
| *C01D 15/00* | (2006.01) |
| *H01M 4/02* | (2006.01) |

(52) U.S. Cl.
CPC .......... *H01M 10/052* (2013.01); *C01G 51/00* (2013.01); *H01M 4/1315* (2013.01); *H01M 4/13915* (2013.01); *H01M 4/366* (2013.01); *H01M 4/525* (2013.01); *H01M 10/0525* (2013.01); *C01D 15/00* (2013.01); *C01P 2002/34* (2013.01); *H01M 2004/028* (2013.01)

(58) Field of Classification Search
CPC ............ H01M 10/052; H01M 4/1315; H01M 4/13915; H01M 10/0525; H01M 4/366; H01M 4/525; H01M 2004/028; C01G 51/00; C01D 15/00; C01P 2002/34
See application file for complete search history.

(56) References Cited

U.S. PATENT DOCUMENTS

| | | | |
|---|---|---|---|
| 9,246,188 B2 | 1/2016 | Zhao et al. | |
| 2004/0200998 A1 | 10/2004 | Park et al. | |
| 2011/0045248 A1* | 2/2011 | Hoffmuller | B42D 25/342 |
| | | | 428/156 |
| 2011/0045348 A1 | 2/2011 | Kubo et al. | |
| 2011/0280280 A1* | 11/2011 | Kochergin | G01K 11/32 |
| | | | 374/161 |
| 2013/0202971 A1* | 8/2013 | Zhao | H01M 6/185 |
| | | | 429/323 |
| 2013/0260209 A1 | 10/2013 | Hallac et al. | |
| 2014/0113157 A1* | 4/2014 | Sato | H01J 37/317 |
| | | | 428/600 |
| 2014/0113187 A1* | 4/2014 | Winoto | H01M 6/186 |
| | | | 429/189 |
| 2014/0193689 A1 | 7/2014 | Takami et al. | |
| 2015/0132626 A1* | 5/2015 | Park | H01M 10/0562 |
| | | | 429/94 |
| 2015/0214550 A1 | 7/2015 | Song et al. | |

(Continued)

FOREIGN PATENT DOCUMENTS

| | | |
|---|---|---|
| CN | 102017244 A | 4/2011 |
| CN | 104466239 A | 3/2015 |

(Continued)

OTHER PUBLICATIONS

The decision of KIPO to grant a Patent to Application No. 10-2016-0122465 (Year: 2017).*
The decision of EPO to grant a Patent to Application No. 17853364.2-1103 / 3444880 (Year: 2020).*
The decision of JPO to grant a Patent to Application No. 2018-553415 (Year: 2020).*
CN105489859_MT (Year: 0420).*
CN104466239A_Description_MT (Year: 2015).*
CN105552327A_Description MT (Year: 2016).*

(Continued)

*Primary Examiner* — Alexander Usyatinsky
(74) *Attorney, Agent, or Firm* — Birch, Stewart, Kolasch & Birch, LLP

(57) ABSTRACT

The present invention relates to a Li-rich antiperovskite-coated LCO-based lithium complex, a method of preparing the same, and a positive electrode active material and a lithium secondary battery, both of which include the LCO-based lithium complex. When a lithium complex in which a coating layer of a compound having a lithium-rich antiperovskite (LiRAP) crystal structure is formed on surfaces of LCO-based particles is applied as the positive electrode active material, the lithium complex is favorable for batteries which are operated at a high voltage, has high lithium ion conductivity, and can be applied to lithium secondary batteries which are driven at a high temperature due to high thermal stability.

10 Claims, 4 Drawing Sheets

(56) References Cited

U.S. PATENT DOCUMENTS

| | | | |
|---|---|---|---|
| 2015/0364788 A1* | 12/2015 | Lu | C23C 14/06 427/597 |
| 2016/0260962 A1 | 9/2016 | Mane et al. | |
| 2016/0293951 A1 | 10/2016 | Lim et al. | |
| 2016/0351909 A1 | 12/2016 | Bittner et al. | |

FOREIGN PATENT DOCUMENTS

| | | | |
|---|---|---|---|
| CN | 104466239 A | * | 3/2015 |
| CN | 10-1588652 B1 | | 1/2016 |
| CN | 105489859 A | | 4/2016 |
| CN | 105489859 A | * | 4/2016 |
| CN | 105552327 A | | 5/2016 |
| CN | 105552327 A | * | 5/2016 |
| CN | 105932225 A | | 9/2016 |
| JP | 2013-54926 A | | 3/2013 |
| JP | 2014-49310 A | | 3/2014 |
| JP | 2014049310 | * | 3/2014 |
| JP | 2016-18610 A | | 2/2016 |
| JP | 2016-504711 A | | 2/2016 |
| JP | 2016018610 | * | 2/2016 |
| JP | 5934340 B2 | | 6/2016 |
| KR | 2003-0083476 A | | 10/2003 |
| KR | 10-2015-0090751 A | | 8/2015 |
| KR | 10-1633256 B1 | | 6/2016 |
| WO | WO 2012/112229 A2 | | 8/2012 |
| WO | WO 2015/094847 A1 | | 6/2015 |
| WO | WO 2015/130106 A1 | | 9/2015 |
| WO | WO 2016/035713 A1 | | 3/2016 |
| WO | WO2016035713 | * | 3/2016 |
| WO | WO2016035713 | * | 6/2017 |
| WO | WO 2017/190270 A1 | | 11/2017 |

OTHER PUBLICATIONS

Extended European Search Report dated Mar. 6, 2019, for European Application No. 17853364.2.
Braga et al., "Novel Li3ClO based glasses with superionic properties for lithium batteries," J. Mater. Chem. A, 2014, 2, 5470-5480.
Hartwig et al., "Ionic Conductivities of Lithium-Halide-Based Quaternary Compounds," Solid State Ionics 3/4, 1981, 249-254.
Hong et al., "Effects of La2O3/Li2O/TiO2-Coating on Electrochemical Performance of LiCoO2 Cathode," Journal of Rare Earths 25 (2007) 124-128.
International Search Report (PCT/ISA/210) issued in PCT/KR2017/010141, dated Jan. 4, 2018.
Jang et al., "LiAlyCo1—yO2 (R3m) Intercalation Cathode for Rechargeable Lithium Batteries," Journal of the Electrochemical Society, 146(3), 1999, 862-868.
Jung et al., "Enhanced Stability of LiCoO2 Cathodes in Lithium-Ion Batteries Using Surface Modification by Atomic Layer Deposition," Journal of the Electrochemical Society, 157 (1), 2010, A75-A81.
Kannan et al., "High Capacity Surface-Modified LiCoO2 Cathodes for Lithium-Ion Batteries," Electrochemical and Solid-State Letters, 6(1), 2003, A16-A18.
Kannan et al., "Surface/Chemically Modified LiMn2O4 Cathodes for Lithium-Ion Batteries," Electrochemical and Solid-State Letters, 5 (7), 2002, A167-A169.
Kim et al., "Electrochemical Stability of Thin-Film LiCoO2 Cathodes by Aluminum-Oxide Coating," Chem. Mater. 2003, 15, 1505-1511.
Lü et al., "Li-rich anti-perovskite Li3OCl films with enhanced ionic conductivity," Chem. Commun., 50(78), 2014, 11520-11522.
Tukamoto et al., "Electronic Conductivity of LiCoO2 and Its Enhancement by Magnesium Doping," Journal of the Electrochemical Society, 144(9), Sep. 1997, 3164.
Wang et al., "Effect of LiFePO4 coating on electrochemical performance of LiCoO2 at high temperature," Solid State Ionics 178 (2007) 131-136.
Zhang et al., "High pressure-high temperature synthesis of lithium-rich Li3O(Cl, Br) and Li3 _ xCax/2OCl anti-perovskite halides," Inorganic Chemistry Communications 48 (2014) 140-143.
Zhao et al., "Superionic Conductivity in Lithium-Rich Anti-Perovskites," J. Am. Chem. Soc. 2012, 134, 15042-15047.
Deng, Z., et al., "Rational Composition Optimization of the Lithium-Rich Li3OCl1-xBrx Anti-Perovskite Superionic Conductors", Chemistry of Materials, 2015, vol. 27, No. 10, pp. 3749-3755.
Lu, X., et al., "Antiperovskite Li3 OCl Superionic Conductor Films for Solid-State Li-Ion Batteries", Advanced Science, 2016, vol. 3, No. 3, 1500359 (pp. 1-5).
Yongguang, L., et al., "Study on LiNi1/3Co1/3Mn1/3O2 materials coated by Li0.5La0.5TiO3", New Chemical Materials, 2013, vol. 41, No. 2, 109-111.

* cited by examiner

[Figure 1]
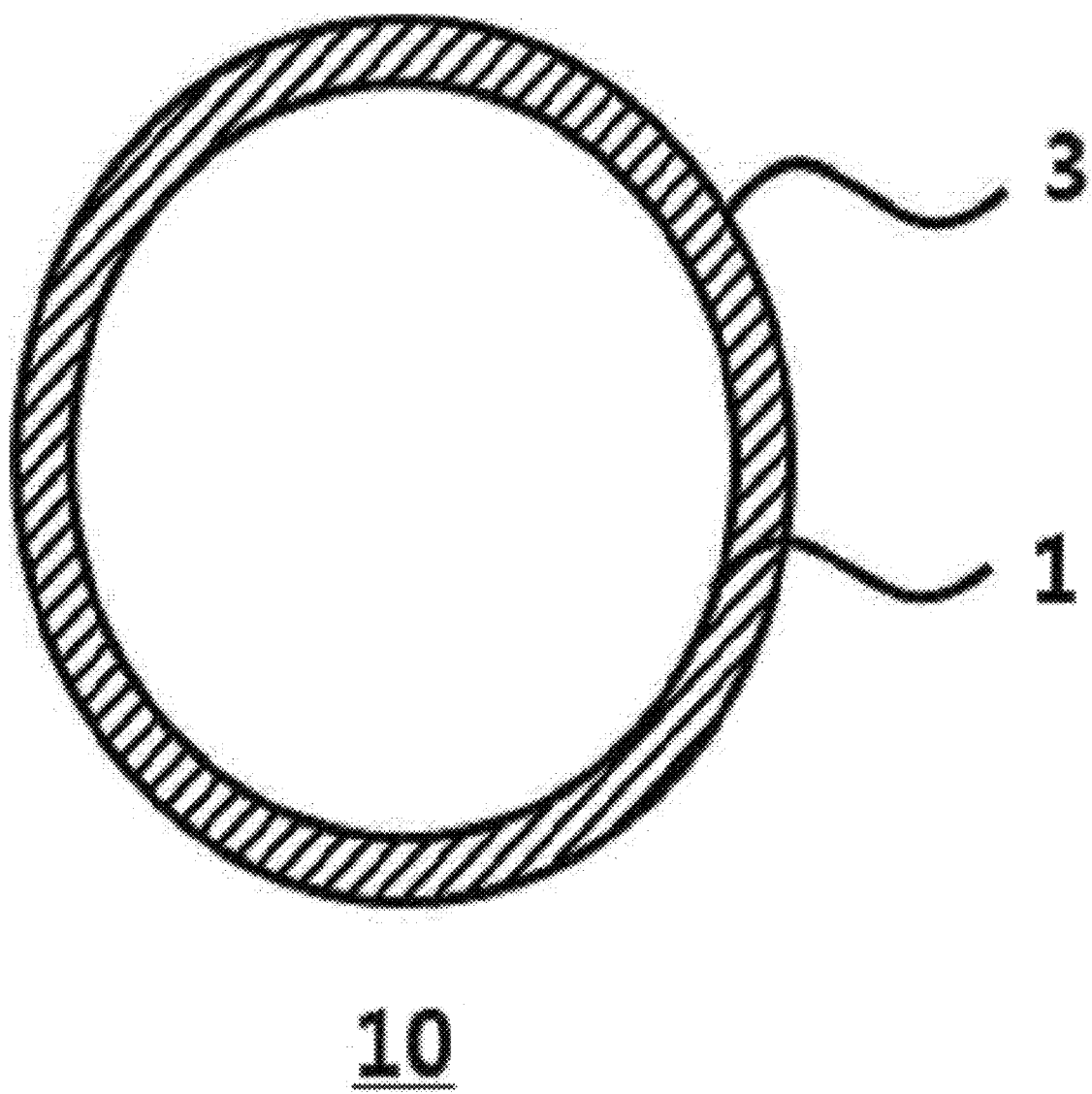
10

[Figure 2]
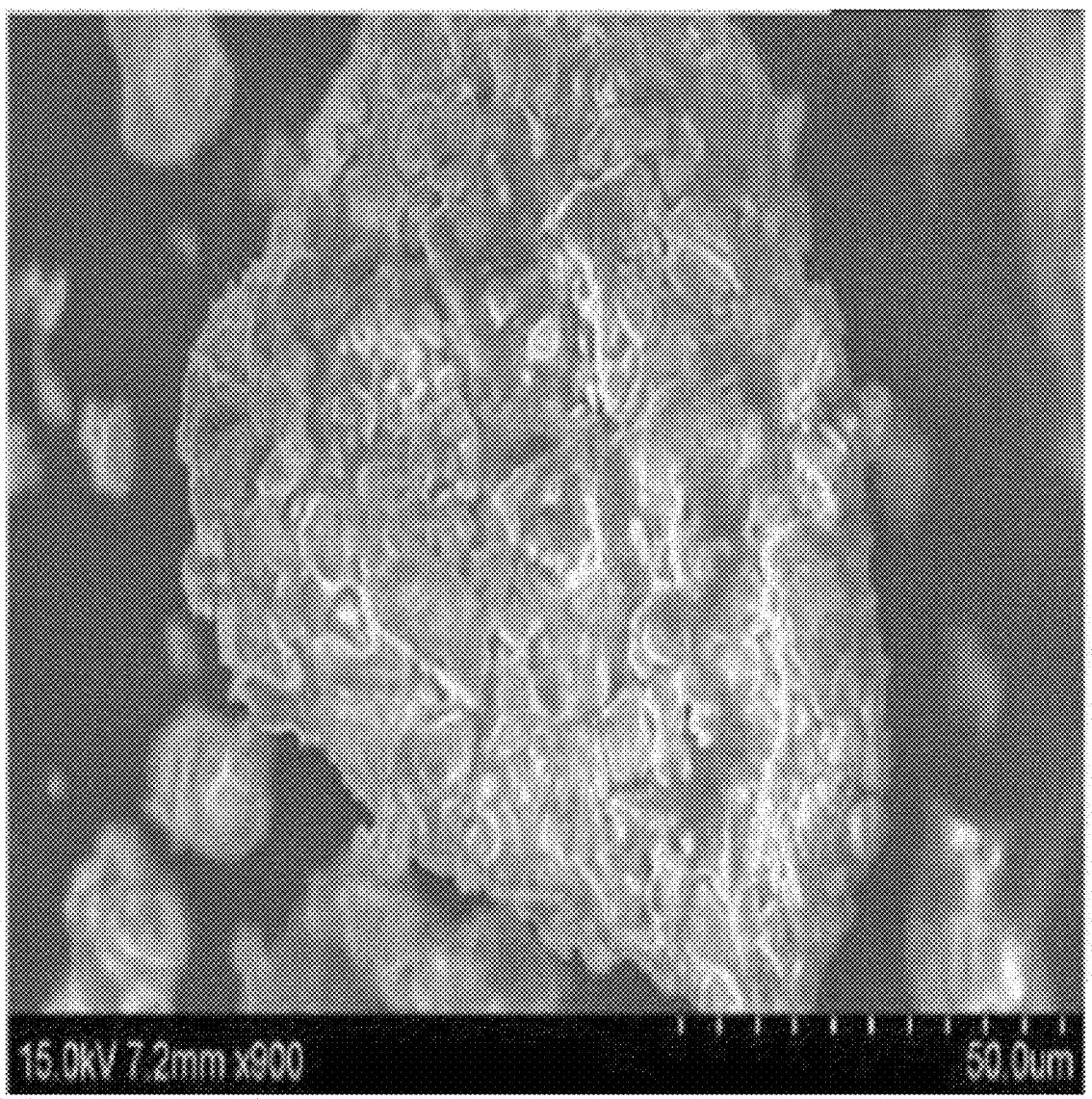

[Figure 3]
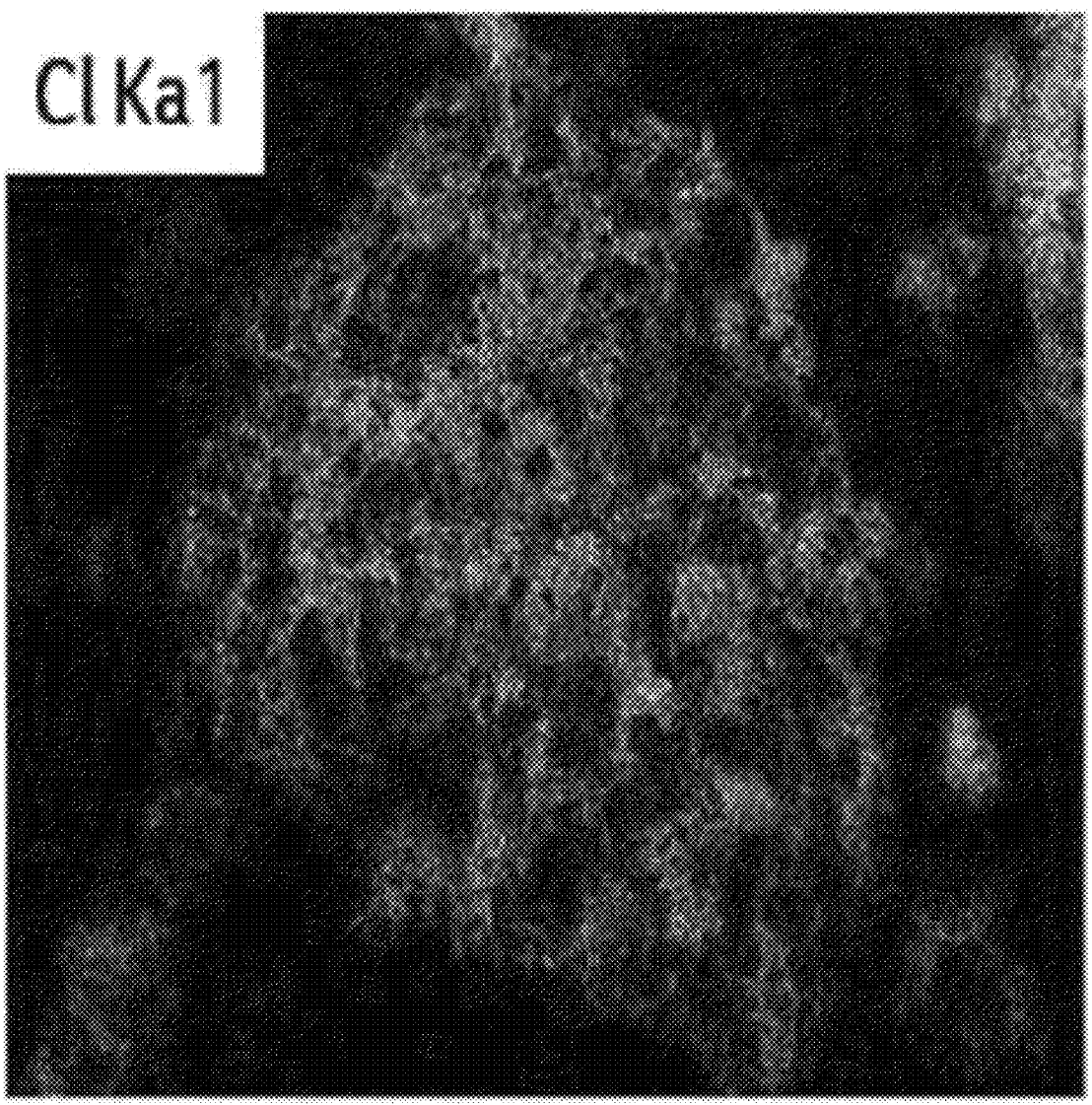

[Figure 4]
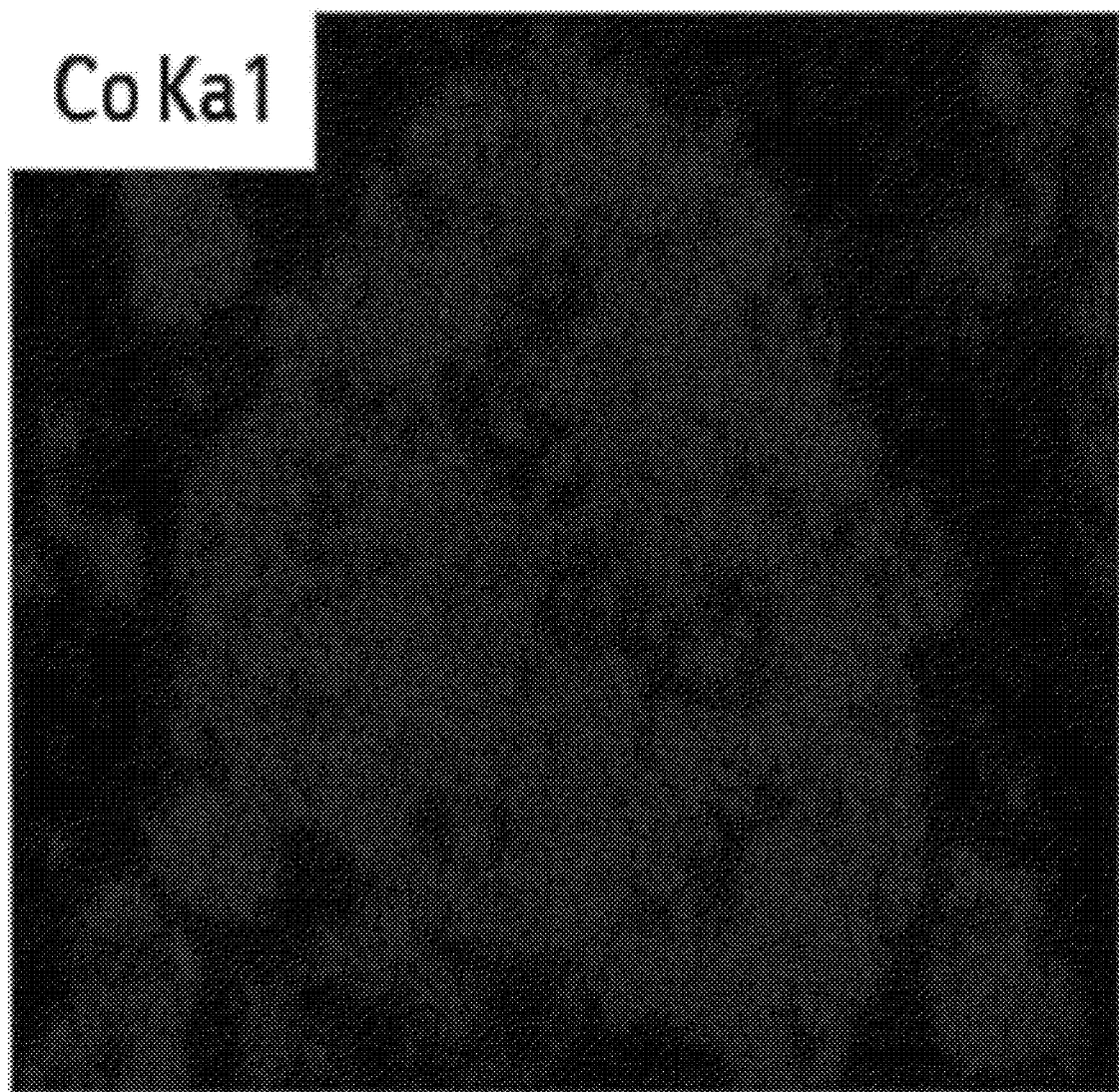

LITHIUM-RICH ANTIPEROVSKITE-COATED LCO-BASED LITHIUM COMPOSITE, METHOD FOR PREPARING SAME, AND POSITIVE ELECTRODE ACTIVE MATERIAL AND LITHIUM SECONDARY BATTERY COMPRISING SAME

TECHNICAL FIELD

This application claims priority to and the benefit of Korean Patent Application No. 10-2016-0122465, filed on Sep. 23, 2016, the disclosure of which is incorporated herein by reference in its entirety.

The present invention relates to a lithium cobalt oxide (LCO)-based lithium complex capable of being applied as a positive electrode active material of a high-voltage lithium secondary battery, a method of preparing the same, and the use thereof.

BACKGROUND ART

With the current growing interest in environmental issues, a lot of research has been conducted on electric vehicles and hybrid electric vehicles that may replace vehicles, such as gasoline vehicles, diesel vehicles, and the like, using fossil fuels, which has been pointed out as one of main causes of atmospheric pollution.

A secondary battery used as a power source in medium/large devices such as the electric vehicles or energy storage systems (ESS) require high output, high energy density, and high energy efficiency. $LiMn_2O_4$ has an advantage in that it is inexpensive and has high output, but has a drawback in that it has an energy density lower than a lithium cobalt oxide.

Because the performance of such products depends on the battery as a core part, there is an increasing demand for high-capacity batteries by consumers. An increase in capacity of such a battery tends to come with an increase in voltage of a battery system.

Accordingly, although conventional lithium secondary batteries are charged with a charge voltage of 3.0 V to 4.2 V, research has been conducted to apply a higher charge voltage (4.3 V to 5.0 V) to the lithium secondary batteries, thereby exhibiting higher energy capacity.

A lithium cobalt oxide represented by $LiCoO_2$ is used as a positive electrode active material for high voltage. That is, the $LiCoO_2$ positive electrode active material is one of active materials that have been most widely used due to high energy density, stability and electrochemical efficiency at a charge voltage less than 4.2 V. However, the capacity of the lithium secondary batteries may be sharply decayed due to the Co dissolution, a structural change and decomposition of electrolytes in a voltage range of 4.3 V or more.

Therefore, various attempts have been made to solve the above problems.

An article by Takamoto et al. reported that the ion conductivity of the positive electrode active material is improved when some of $Co^{3+}$ ions in the lithium cobalt oxide are substituted with $Mg^{2+}$. However, a capacity decay of a positive electrode may not be improved by Mg doping, and the Mg-doped positive electrode has a specific capacity lower than bare $LiCoO_2$ [Tukamoto H, West A R. Electronic conductivity of $LiCoO_2$ and its enhancement by magnesium doping. *J Electrochem Soc*, 1997, 144: 3164-3168].

Therefore, to improve a decrease in capacity retention through the doping, there is proposed a plan to coat a surface of $LiCoO_2$ with $Al_2O_3$, $ZrO_2$, ZnO, $SiO_2$, $TiO_2$, a metal phosphate (e.g., $AlPO_4$), a metal fluoride (e.g., $AlF_3$), and the like using a wet coating method such as a sol-gel method [Jang et al., $LiAl_yCo_{1-y}O_2$(R3m) Intercalation Cathode for Rechargeable Lithium Batteries, *J. Electrochem. Soc.* 1999 Volume 146, Issue 3, 862-868; Kim et al., Electrochemical Stability of Thin-Film $LiCoO_2$ Cathodes by Aluminum-Oxide Coating *Chemistry of Materials* 2003 15 (7), 1505-1511; A. M. Kannan and A. Manthiram, Surface/Chemically Modified $LiMn_2O_4$ Cathodes for Lithium-Ion Batteries, *Electrochem. Solid-State Lett.* 2002 Volume 5, Issue 7, A167-A169].

However, the coating process requires large amounts of a solvent and a precursor during coating, and has difficulties in processes because a post-heat-treatment process should be performed after the coating process. Also, the capacity decay may occur under high-voltage and high-temperature environments due to low thermal stability of the coated $LiCoO_2$ complex.

As an alternative to solve the problems, Korean Registered Patent No. 10-1588652 proposes a technique of coating a surface of a lithium cobalt oxide with a nanosized Zr oxide and a nanosized Si oxide, and simultaneously discloses that the coating may inhibit the capacity decay even under high-voltage and high-temperature environments.

Although the various techniques have been proposed as described above, there is a urgent demand for technical development of lithium secondary batteries capable of being operated under high-voltage and high-temperature environments.

Patent Document 1: Korean Registered Patent No. 10-1588652 (Jan. 20, 2016) entitled "Positive Electrode Active Material, Lithium Secondary Battery Having the Same and Manufacturing Method Thereof)"

Non-patent Document 1: Tukamoto H, West A R. Electronic conductivity of $LiCoO_2$ and its enhancement by magnesium doping. J Electrochem Soc, 1997, 144: 3164-3168.

Non-patent Document 2: Jang et al., $LiAl_yCo_{1-y}O_2$(R3m) Intercalation Cathode for Rechargeable Lithium Batteries, J. Electrochem. Soc. 1999 Volume 146, Issue 3, 862-868

Non-patent Document 3: Kim et al., Electrochemical Stability of Thin-Film $LiCoO_2$ Cathodes by Aluminum-Oxide Coating Chemistry of Materials 2003 15 (7), 1505-1511

Non-patent Document 4: A. M. Kannan and A. Manthiram, Surface/Chemically Modified $LiMn_2O_4$ Cathodes for Lithium-Ion Batteries, Electrochem. Solid-State Lett. 2002 Volume 5, Issue 7, A167-A169

DISCLOSURE

Technical Problem

Therefore, the present inventors have conducted much research to eliminate a decrease in capacity of a battery even when the battery is operated at a high voltage of 4.3 V or more, and found that, when a complex having a core-shell structure in which a surface of a lithium cobalt oxide is coated with a lithium-rich antiperovskite compound is prepared and applied as a positive electrode active material, a battery may be stably driven. Therefore, the present invention has been completed based on the facts.

Accordingly, it is an object of the present invention to provide a LCO-based lithium complex having a novel structure, and a method of preparing the same.

It is another object of the present invention to provide a use of the LCO-based lithium complex applied as a positive electrode active material of a lithium secondary battery.

Technical Solution

To solve the above problems, according to an aspect of the present invention, there is provided a LCO-based lithium complex in which a coating layer of a compound having a lithium-rich antiperovskite (LiRAP) crystal structure is formed on surfaces of LCO-based particles.

In this case, the LCO-based particle may have an average particle diameter of 1 to 1,000 nm.

Also, the coating layer may have a thickness of 1 nm to 100 μm.

According to another aspect of the present invention, there is provided a method of preparing a LCO-based lithium complex, which includes dry- or wet-coating LCO-based particles with the lithium-rich antiperovskite compound.

According to still another aspect of the present invention, there is provided a method of preparing a LCO-based lithium complex, which includes preparing a mixed solution of a lithium-rich antiperovskite compound precursor, mixing the mixed solution with LCO-based particles, and forming a coating layer of a lithium-rich antiperovskite compound on the LCO-based particles by means of a sol-gel process and heat treatment.

According to yet another aspect of the present invention, there are provided a positive electrode active material for lithium secondary batteries and a lithium secondary battery, both of which include the LCO-based lithium complex.

Advantageous Effects

A LCO-based lithium complex having a novel core-shell structure according to the present invention can be useful in maintaining high ion conductivity even when a secondary battery is driven at a high voltage because a surface of the LCO-based lithium complex is coated with a compound having a lithium-rich antiperovskite crystal structure, and satisfies all characteristics such as an electrochemically stable potential window, low electrical conductivity, low toxicity, and the like.

Also, the LCO-based lithium complex can be applied to various lithium secondary batteries which are operated at room and high temperatures due to high-temperature stability of the lithium-rich antiperovskite compound, such as solid oxide batteries, all-solid-state batteries, lithium-sulfur batteries, and the like, and particularly applied to high-voltage lithium secondary batteries.

DESCRIPTION OF DRAWINGS

FIG. 1 is a cross-sectional view showing a core-shell LCO-based lithium complex 10 provided in the present invention.

FIGS. 2 to 4 are scanning electron microscope images of a LCO-based lithium complex, a Cl element, and a Co element, respectively.

BEST MODE

In the present invention, a complex having a novel composition, which may be used as a positive electrode active material of a lithium secondary battery, is provided.

Core-Shell LCO-Based Lithium Complex

FIG. 1 is a cross-sectional view showing a core-shell LCO-based lithium complex 10 provided in the present invention. Here, the LCO-based lithium complex 10 has a structure in which a shell 3 is formed as a coating layer on a core 1. In this case, lithium cobalt oxide (LCO)-based particles are used as the core 1, and a compound having a lithium-rich antiperovskite crystal structure is used as the shell 3.

As disclosed in this specification, all the terms "core 1," "lithium cobalt oxide," and "LCO-based particles" refer to a core 1 or particles constituting the core 1.

Also, as disclosed in this specification, all the terms "shell 3," "lithium-rich antiperovskite compound," and "LiRAP-based compound" refer to a shell 3 or a material constituting the shell 3.

Hereinafter, each of the compositions will be described in further detail.

The lithium cobalt oxide (LCO)-based particles used as the core 1 is not limited in the present invention, and all lithium cobalt oxides known in the art may be used herein.

$$LiCoO_2 \quad (1)$$

$$Li_{1-a}CoO_2 \ (0<a<1) \quad (2)$$

$$Li_bCoM_cO_2 \ (M=W, \ Mo, \ Zr, \ Ti, \ Mg, \ Ta, \ Al, \ Fe, \ V,$$
$$Cr, \ or \ Nb, \ 1 \leq b \leq 1.2, \ and \ 0 \leq c \leq 0.02) \quad (3)$$

$$LiCo_{1-d}Mn_dO_2 \ (0 \leq d<1) \quad (4)$$

$$LiMn_{2-e}Co_eO_4 \ (0<e<2) \quad (5)$$

$$LiNi_{1-f}Co_fO_2 \ (0 \leq f<1) \quad (6)$$

$$LiNi_{1-g-h}CoM_hO_2 \ (M=Al, \ Sr, \ Mg, \ or \ La, \ 0 \leq g \leq 1,$$
$$0 \leq h \leq 1, \ and \ 0 \leq g+h \leq 1) \quad (7)$$

$$Li(Ni_jCo_kMn_l)O_2 \ (0<j<1, \ 0<k<1, \ 0<l<1, \ and \ j+k+l=1) \quad (8)$$

$$Li(Ni_mCo_nMn_o)O_4 \ (0<m<2, \ 0<n<2, \ 0<o<2, \ and$$
$$m+n+o=2) \quad (9)$$

$$Li_{1+p}Ni_qCo_rMe_sO_2 \ (Me=SC, \ Y, \ La, \ Rh, \ Ir, \ Al, \ Ga,$$
$$In, \ or \ Ta, \ 0.02 \leq p \leq 0.2, \ 0.4 \leq q \leq 0.58, \ 0.4 \leq r \leq 0.5,$$
$$0.0 \leq s \leq 0.1, \ and \ p+q+r+s=1) \quad (10)$$

$$Li_tNi_uMn_vCo_wO_2 \ (1 \leq t \leq 1.2, \ u=1-v-w, \ 0<v<1,$$
$$0<w<1, \ u>v, \ w=nv \ or \ v=nw, \ and \ n>1) \quad (11)$$

The LCO-based particles represented by Equations (1) to (11) are materials that enable intercalation/deintercalation of lithium ions, and thus are used as a positive electrode active material of a lithium secondary battery. Particularly, the LCO-based particles may be preferably used in high-voltage lithium secondary batteries. Among the equations, the LCO-based particles of Equations (1) and (2) may be preferably used.

In this case, the LCO-based particles of Equation (2) may be particles having a layered crystal structure.

The core 1 may further include a lithium-reactive element, when necessary. Accordingly, when two-dimensional lithium migration pathway on a surface of the positive electrode active material is converted into a three-dimensional lithium migration pathway, capacity retention characteristics may be improved due to an increase in migration velocity of lithium ions when the lithium-reactive element is applied to batteries. Also, capacity characteristics may be improved without causing a decrease in initial capacity due to a decrease in resistance on the surface of the positive electrode active material.

The LCO-based particles may be coated with the lithium-reactive element which includes one or more metals selected from the group consisting of Ti, W, Zr, Mn, Mg, P, Ni, Al, Sn, V, Cr, and Mo. Among these, one or two or more lithium-reactive elements selected from the group consisting of Ti, P, Mn, and Al, all of which have an excellent effect in forming a lithium-deficient structure due to excellent reactivity with lithium, may be used.

In this case, the coating may be performed by coating the entire core 1 or discontinuously distributing the core 1. Preferably, the core 1 may be discontinuously distributed. In the present invention, the expression "discontinuously distributing" a lithium compound means that there are a lithium compound-dispersed area and a lithium compound-free area in a certain region, wherein the lithium compound-free area is distributed to isolate, disconnect or separate the lithium compound-dispersed area like an island type so that the lithium compound-dispersed area is distributed without any continuity.

The lithium-reactive element is included in such a content that the lithium-reactive element can be continuously or discontinuously present on the core 1, thereby forming a rapid pathway for lithium ions. However, when the content of the lithium-reactive element is too high, an increase in resistance in the shell 3 may be rather caused. Therefore, the content of the lithium-reactive element is properly defined as a content of 50 to 50,000 ppm. The treatment using the lithium-reactive element may be carried out by treating the LCO-based particles with the lithium-reactive element or an oxide, a hydroxide, an oxyhydroxide, a halide, a nitrate, a carbonate, an acetate, an oxalate, a citrate, or a sulfate thereof, and a mixture of two or more, followed by heat treatment at 400° C. to 1100° C.

Particles of the core 1 provided in the present invention have such a particle diameter range so that the particles of the core 1 may be used as the positive electrode active material. For example, the articles of the core 1 have an average particle diameter of 1 to 1,000 nm, particularly 5 to 500 nm, and preferably 10 to 100 nm. When the particles of the core 1 have an average particle diameter in this range, a surface of the core 1 may be uniformly coated with the ensuing LiRAP compound without lumping between particles during a preparation process.

Also, for the core 1, a lithium element may be distributed in the core with a single concentration value, or may be distributed with a concentration gradient which gradually increases from the interface between the core 1 and the shell 3 to the center of the core 1. When the lithium element is distributed with such a concentration gradient, the concentration gradient may gradually increases toward the center of the core 1 in a range of each of the integers 'a to w' in Equations (2) to (11).

The preparation of the core 1 having such characteristics is not particularly limited in the present invention, and the preparation of a composite metal oxide using a dry or wet process as known in the art may be used.

The preparation of the core 1 using a wet process is as follows.

First, a basic or acidic aqueous solution is added to a mixed aqueous solution including precursors of metals represented by Equations (1) to (11) to prepare a precursor mixed solution whose pH is adjusted. The agitation may be carried out under an inert gas atmosphere to facilitate the synthesis. In this case, the inert gas may include nitrogen, argon, helium, and the like.

A metal precursor may include one or more selected from hydroxides, sulfates, alkoxides, oxalates, phosphates, halides, oxyhalides, sulfides, oxides, peroxides, acetates, nitrates, carbonates, citrates, phthalates, and perchlorates of the metals. Ammonia, sodium hydroxide, and the like may be used as a base for the pH control, and sulfuric acid, hydrochloric acid or nitric acid may be used as an acid.

Next, another precursor solution of the metals represented by Equations (1) to (11) is added to the precursor mixed solution, and co-precipitated to form precipitates.

The co-precipitation may be generally carried out in a pH range of pH 11 to 12 while stirring at a rate of 100 to 1,000 rpm in a constant temperature range of 40 to 60° C., and the pH may be controlled by adding a basic aqueous solution as described above.

The co-precipitation may be carried out under an inert gas atmosphere to promote a co-precipitation reaction. In this case, the inert gas may include nitrogen, helium, argon, and the like.

Then, the precipitates are dried and heat-treated to prepare LCO-based particles constituting the core 1.

The drying is not particularly limited, and may, for example, be carried out in a temperature range of 80 to 120° C.

The heat treatment may be carried out by calcining the precipitates in a range of temperature of 200 to 800° C., and the calcination may be carried out under an oxygen or air atmosphere.

Particularly, the LCO-based lithium complex 10 according to the present invention is a compound having a lithium-rich antiperovskite (hereinafter referred to as 'LiRAP') crystal structure that forms the shell 3.

In the antiperovskite structure ($ABX_3$), X refers to a cation such as an alkali metal, and A and B refer to an anion. Hundreds of different types of the perovskite and antiperovskite crystal structures are known depending on which atoms (or functional groups) exist on A, B and X, and also have various electrical characteristics in conductors, semiconductors, and non-conductors.

The LCO-based lithium complex 10 provided in the present invention is used as the positive electrode active material. In this case, the performance and physical properties of the lithium secondary battery may be determined depending on a reaction at the interface between the positive electrode active material and an electrolyte, and lithium ion conductivity. Accordingly, the LiRAP compound is used for the shell 3 for the purpose of the rapid transfer of lithium ions across the interface.

When the lithium-rich LiRAP compound is introduced so that the LCO-based lithium complex 10 is applied as the positive electrode active material, a reaction at the interface between the positive electrode active material and the electrolyte may rapidly occur due to high lithium ion conductivity, characteristics of the LiRAP compound itself, particularly structure stability at a high temperature may be improved to prevent capacity decay of the lithium secondary battery when the lithium secondary battery is driven at a high temperature.

The LiRAP compounds used in the present invention may be compounds represented by the following Equations (12) to (18), which may be used alone or in combination of two or more.

$$Li_3OCl \quad (12)$$

$$Li_{(3-a)}M_{a/2}OHal \text{ (M=Mn, Ca, Ba, or Sr, Hal=F, Cl, Br, or I, and } 0<a<3) \quad (13)$$

$$Li_{(3-b)}N_{(b/3)}OHal \text{ (N=a trivalent metal, Hal=F, Cl, Br, or I, and } 0\leq b\leq 3) \quad (14)$$

$$LiOX_cY_{(1-c)}, \text{ (X and Y are different halides, and } 0\leq c\leq 1) \quad (15)$$

$$Li_{3-d}ClO_{1-d}Hal_d \text{ (Hal=F, Cl, Br, or I, and } 0<d<1) \quad (16)$$

$$Li_{3-e-f}A_eO_{1-f}Hal_fCl \text{ (A=Na, or K, Hal=F, Cl, Br, or I, } 0<e<2, \text{ and } 0<f<1) \quad (17)$$

$$Li_{3-2g-h}M_gO_{1-h}Hal_hCl \text{ (M=Mg, Mn, Ca, Ba, or Sr, Hal=F, Cl, Br, or I, } 0<g<1, \text{ and } 0<h<1) \quad (18)$$

The LiRAP compounds represented by Equations (12) to (18) have an ion conductivity of 10 to $10^{-10}$ S/cm.

Specifically, the $Li_3OCl$ represented by Equation (12) is a representative LiRAP compound that has a high level ion conductivity of $0.85 \times 10^{-3}$ S/cm at room temperature, and exhibits excellent stability at a high temperature because the LiRAP compound has an orthorhombic crystal structure with a tetragonal phase.

Also, the LiRAP compound represented by Equation (13) is a compound in which a metal is substituted for a lithium cation, and has an ion conductivity of $10^{-2}$ S/cm at room temperature, the value of which is higher than that of the $Li_3OCl$ ($10^{-3}$ S/cm).

In addition, the LiRAP compounds represented by Equations (14) and (15) have an ion conductivity of approximately $10^{-7}$ S/cm at room temperature.

In particular, the LiRAP compounds represented by Equations (16), (17) and (18) have a structure in which a dopant is not substituted for a Cl site but is substituted for an oxygen (O) site like Equations (12) to (15). The compounds having such a structure have ion conductivity and thermal stability similar to or higher than the LiRAP compounds represented by Equations (12) to (15).

As the LiRAP compound constituting the shell 3, the compounds selected from the compounds represented by Equations (12) to (18) may be used alone or in combination of two or more. Also, the LiRAP compounds satisfy the same equations, wherein different types of the metal or dopant may be used herein. In this case, selection of the compound is not particularly limited in the present invention. For example, the compound may be properly selected by a person having ordinary skill in the related art.

According to one exemplary embodiment of the present invention, the LiRAP compounds of Equations (12), (15) and (16) are prepared by mixing a lithium halide (e.g., LiCl) precursor with a lithium hydroxide (LiOH) or lithium nitrate ($LiNO_3$) precursor; and annealing the resulting mixture at a high temperature of 180 to 400° C. In this case, the LiRAP compounds of Equation (12) and (15) are prepared by varying the conditions or compositions used in each of the steps.

In the case of the LiRAP compounds of Equations (13), (14), (17) and (18), a precursor containing M, N or A may be added at the mixing step to prepare (Li,M; Li,N; or $Li,A)_3OCl$.

The precursor may include one or more selected from a hydroxide, a sulfate, an alkoxide, an oxalate, a phosphate, a halide, an oxyhalide, a sulfide, an oxide, a peroxide, an acetate, a nitrate, a carbonate, a citrate, a phthalate, and a perchlorate, all of which contain Mn, Ca, or Ba. Preferably an alkoxide may be used.

In the compounds of Equations (12) to (18), a halogen element may be doped in a solid, liquid or gaseous state, but the present invention is not particularly limited thereto.

For example, the doping may be carried out by adding a compound represented by HX (X=halide) at the step of mixing the precursors, or may be carried out by preparing $Li_3OCl$ or $(Li,M)_3OCl$ and treating the $Li_3OCl$ or $(Li,M)_3OCl$ with HX in a liquid or gaseous phase. In this case, the HX may include at least one selected from the group consisting of HF, HI, HCl, HBr, and combinations thereof, but the present invention is not limited thereto.

In this case, the shell 3 may be coated at a content of 20% by weight or less, preferably 0.0001 to 20% by weight, based on 100% by weight of the LCO-based lithium complex 10. In this case, a coating layer having a thickness ranging from micrometers to nanometers, preferably a thickness of 1 nm to 100 m, and more preferably a thickness of 10 to 100 nm is formed when the content falls within this range.

When the content of the LCO-based lithium complex 10 constituting the shell 3 is less than this content range, a coating layer may not easily formed. On the other hand, when the content of the LCO-based lithium complex 10 is greater than this content range, it may be an obstacle to migration of lithium ions, resulting in increased resistance.

Such resistance is equally applied with respect to limitation on the thickness of the coating layer. That is, when the thickness of the coating layer is less than this thickness range, an effect of enhancing mobility of lithium ions and a subsequent effect of improving characteristics of the battery are insignificant. On the other hand, when the thickness of the coating layer is greater than this thickness range, an increase in resistance may be rather caused. As a result, when the LCO-based lithium complex 10 is used as the positive electrode active material, the performance of the battery may be degraded.

According to one exemplary embodiment of the present invention, the lithium cobalt oxides of Equations (1) and (2) are preferably used as the core 1 constituting the LCO-based lithium complex 10, and the LiRAP compounds of Equations (13), (16) and (18) are preferably used as the shell 3.

The LCO-based lithium complex 10 may be prepared using a known method of preparing a complex having a core-shell structure, and may also be prepared by a batch type process (i.e., one-pot coating synthesis) or a continuous process.

The LCO-based lithium complex 10 according to one exemplary embodiment may be prepared, as follows:

(Method 1) Dry- or wet-coating LCO-based particles with a LiRAP compound (Method 2) Preparing a mixed solution of a LiRAP compound precursor, mixing the mixed solution with the LCO-based particles, and forming a LiRAP coating layer on the LCO-based particles by means of a sol-gel process and heat treatment The aforementioned preparation process (method 1) has an advantage in that it is simple, and a lithium complex may be easily mass-produced, and the preparation process (method 2) has an advantage in that the coating and the preparation of the LiRAP compound may be performed at the same time. In addition to the two methods, methods of preparing complexes having various core-shell structures may be used, but the present invention is not particularly limited thereto. According to one exemplary embodiment of the present invention, the LCO-based lithium complex 10 may be prepared through the process (method 2).

The preparation of LiRAP through (method 1) is not particularly limited. For example, the LiRAP may be prepared using a combination of a known method of preparing a compound having an antiperovskite crystal structure and a method of doping the compound.

Preparation of the LCO-based lithium complex 10 having a core-shell structure through (method 2) is performed, as follows.

First, a precursor solution of the LiRAP compound for constituting the shell 3 is mixed with a LCO-based oxide used as the core 1.

The precursor solution of the LiRAP compound includes precursors of metals represented by Equations (1) to (11), and a dopant solution. In this case, one or more selected from a hydroxide, a sulfate, an alkoxide, an oxalate, a phosphate, a halide, an oxyhalide, a sulfide, an oxide, a peroxide, an acetate, a nitrate, a carbonate, a citrate, a phthalate, and a perchlorate of the metal containing lithium may be used as the lithium precursor. Preferably, a metal hydroxide and a metal halide are used.

A cationic dopant may include one or more selected from the cations provided in Equations (13) to (18), that is, a hydroxide, a sulfate, an alkoxide, an oxalate, a phosphate, a halide, an oxyhalide, a sulfide, an oxide, a peroxide, an acetate, a nitrate, a carbonate, a citrate, a percarbonate, and a perchlorate of the metal containing an alkaline earth metal. Preferably, an alkaline earth metal hydroxide and an alkaline earth metal halide are used.

An anionic dopant solution is an aqueous solution including dopants provided in Equations (13) to (18), that is, halogen elements, preferably elements selected from the group consisting of HF, HI, HCl, HBr, and combinations thereof, but the present invention is not limited thereto.

Next, to prepare the LCO-based lithium complex 10 having a core-shell structure, one or more active materials selected from the LCO-based particles of Equations (1) to (11) are mixed with the precursor mixture, and a trace of $H_2O$ is added thereto to prepare a precursor mixture in a gel phase. Thereafter, the precursor mixture is heat-treated at a temperature of 250 to 350° C. for 2 hours or more, and dried for an hour or more.

The heat treatment time and the drying time are not particularly limited. For example, the heat treatment time is preferably in a range of 2 to 10 hours, and the drying time is preferably in a range of 1 to 5 hours. In this case, the heat treatment and drying may be carried out in the air or under an oxygen atmosphere.

Lithium Secondary Battery

The LCO-based lithium complex 10 provided in the present invention may be applied to lithium secondary batteries due to high ion conductivity and stability at a high temperature.

In the applicable lithium secondary battery, a positive electrode or a negative electrode is not limited. In particular, the positive or negative electrode may be applied to lithium-air batteries, lithium oxide batteries, lithium-sulfur batteries, lithium metal batteries, and all-solid-state batteries, all of which are operated at a high temperature.

For example, a lithium secondary battery includes a positive electrode, a negative electrode, and a separator and an electrolyte, both of which are interposed between the positive and negative electrodes. In this case, a positive electrode active material layer is formed on a positive electrode current collector in the positive electrode. Here, the LCO-based lithium complex 10 of the present invention is used as the positive electrode active material layer.

When the LCO-based lithium complex 10 is used as the positive electrode active material, a reaction at the interface between the core (i.e., an active material) and the electrolyte, and a migration velocity of lithium ions are enhanced due to the LiRAP compound constituting the shell, resulting in improved performance of the battery. Also, the performance and thermal stability of the battery are improved due to the LiRAP compound's own inherent characteristics, an electrochemically stable potential window, low electrical conductivity, high temperature stability, low toxicity, and the like.

As the positive electrode active material constituting the positive electrode, the LCO-based lithium complex 10 may be used alone, or may be used in conjunction with a lithium composite metal oxide used as the known positive electrode active material.

For example, the lithium composite metal oxide that may be added may include one or more selected from the group consisting of lithium manganese oxides such as $Li_{1+x}Mn_{2-x}O_4$ ($0 \leq x \leq 0.33$), $LiMnO_3$, $LiMn_2O_3$, $LiMnO_2$, and the like; a lithium copper oxide ($Li_2CuO_2$); vanadium oxides such as $LiV_3O_8$, $LiFe_3O_4$, $V_2O_5$, $Cu_2V_2O_7$, and the like; an Ni-site-type lithium nickel oxide represented by the formula $LiNi_{1-x}M_xO_2$ (where M is Mn, Al, Cu, Fe, Mg, B, or Ga; and $0.01 \leq x \leq 0.3$); a lithium-manganese complex oxide represented by the formula $LiMn_{2-x}M_xO_2$ (M is Ni, Fe, Cr, Zn, or Ta; and $0.01 \leq x \leq 0.1$) or $Li_2Mn_3MO_8$ (M is Fe, Ni, Cu, or Zn); a lithium manganese composite oxide having a spinel structure represented by $LiNi_xMn_{2-x}O_4$; and $LiMn_2O_4$ in which some of Li ions are substituted with alkaline earth metal ions.

Such a positive electrode active material may be formed on a positive electrode current collector. The positive electrode current collector is not particularly limited as long as the positive electrode current collector has high conductivity without causing a chemical change in the corresponding battery. For example, stainless steel, aluminum, nickel, titanium, baked carbon, or aluminum or stainless steel whose surface is surface-treated with carbon, nickel, titanium, silver, and the like may be used. In this case, the positive electrode current collector may be used in various forms of films, sheets, foil, nets, porous materials, foams, nonwoven fabrics, and the like, all of which have fine irregularities formed on a surface thereof, to enhance adhesion to the positive electrode active material.

Also, in the negative electrode, a negative electrode mixture layer including a negative electrode active material is formed on a negative electrode current collector, or a negative electrode mixture layer (e.g., lithium foil) is used alone.

In this case, types of the negative electrode current collector or the negative electrode mixture layer are not particularly limited in the present invention. In this case, known materials may be used herein.

In addition, the negative electrode current collector is not particularly limited as long as the negative electrode current collector has conductivity without causing a chemical change in the corresponding battery. For example, copper, stainless steel, aluminum, nickel, titanium, baked carbon, or copper or stainless steel whose surface is surface-treated with carbon, nickel, titanium, silver, and the like, an aluminum-cadmium alloy, and the like may be used. Like the positive electrode current collector, the negative electrode current collector may also be used in various forms of films, sheets, foil, nets, porous materials, foams, nonwoven fabrics, and the like, all of which have fine irregularities formed on a surface thereof.

Further, the negative electrode active material may include carbon-based materials selected from the group consisting of crystalline artificial graphite, crystalline natural graphite, amorphous hard carbon, poorly crystalline soft carbon, carbon black, acetylene black, ketjen black, Super-P, graphene, and fibrous carbon; Si-based materials; metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, elements of the groups 1, 2, and 3 of the periodic table, or a halogen; $0 < x \leq 1$; $1 \leq y \leq 3$; and $1 \leq z \leq 8$), and the like; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymers such as polyacetylene, and the like; Li—Co—Ni-based materials; titanium oxides; lithium titanium oxides, and the like, but the present invention is not limited thereto.

In addition, metal complex oxides such $Sn_xMe_{1-x}Me'_yO_z$ (Me: Mn, Fe, Pb, or Ge; Me': Al, B, P, Si, elements of the groups 1, 2, and 3 of the periodic table, or a halogen; $0 < x \leq 1$; $1 \leq y \leq 3$; and $1 \leq z \leq 8$), and the like; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like may be used as the negative electrode active material. In this case, carbon-based negative electrode active materials such as crystalline carbon, amorphous carbon, or a carbon complex may be used alone or in combination of two or more.

In this case, the electrode mixture layer may further include a binder resin, a conductive material, a filler, and other additives.

The binder resin is used to bind a conductive material to an electrode active material and used to bind to a current collector. Examples of such a binder resin may include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated EPDM, a styrene-butadiene rubber, a fluorocarbon rubber, and various copolymers thereof.

The conductive material is used to further enhance conductivity of the electrode active material. Such a conductive material is not particularly limited as long as the conductive material has conductivity without causing a chemical change in the corresponding battery. For example, graphite such as natural graphite or artificial graphite; carbon blacks such as carbon black, acetylene black, ketjen black, channel black, furnace black, lamp black, thermal black, and the like; conductive fibers such as a carbon fiber or a metal fiber; metal powders such as hydrofluorocarbon, aluminum, nickel powder, and the like; conductive whiskers such as zinc oxide, potassium titanate, and the like; conductive metal oxides such as titanium oxide, and the like; a polyphenylene derivative, and the like may be used.

The filler may be optionally used as a component for inhibiting expansion of an electrode, and is not particularly limited as long as the filler is a fibrous material without causing a chemical change in the corresponding battery. For example, olefinic polymers such as polyethylene, polypropylene, and the like; fibrous materials such as a glass fiber, a carbon fiber, and the like are used.

Meanwhile, in the lithium secondary battery, the separator serves to separate the positive electrode from the negative electrode and provide a migration pathway of lithium ions. Typically, the separator may be used without particular limitation as along as the separator is used as the separator for lithium secondary batteries. Particularly, separators exhibiting low resistance to ion migration of the electrolyte and having an excellent electrolyte impregnation ability are preferred. Specifically, porous polymer films, for example, porous polymer films prepared using a polyolefinic polymer such as an ethylene homopolymer, a propylene homopolymer, an ethylene/butene copolymer, an ethylene/hexene copolymer, and an ethylene/methacrylate copolymer, or layered structures of two or more layers may be used. Also, conventional porous non-woven fabrics, for example, non-woven fabrics made of a glass fiber having a high melting point, a polyethylene terephthalate fiber, and the like may also be used. In addition, a coated separator including a ceramic component or a polymer material may also be used to secure heat resistance or mechanical strength. Optionally, a separator having a single-layered or multi-layered structure may be used.

Also, the electrolyte used in the present invention may include an organic liquid electrolyte, an inorganic liquid electrolyte, a solid polymer electrolyte, a gel-type polymer electrolyte, a solid inorganic electrolyte, a melt-type inorganic electrolyte, and the like, all of which may be used to manufacture the lithium secondary battery, but the present invention is not limited thereto.

Specifically, the electrolyte may include an organic solvent and a lithium salt.

The organic solvent may be used without particular limitation as long as the organic solvent may serve as a medium through which ions participating in an electrochemical reaction in the battery may migrate. Specifically, ester-based solvents such as methyl acetate, ethyl acetate, γ-butyrolactone, ε-caprolactone, and the like; ether-based solvents such as dibutyl ether, tetrahydrofuran, and the like; ketone-based solvents such as cyclohexanone, and the like; aromatic hydrocarbon-based solvents such as benzene, fluorobenzene, and the like; carbonate-based solvents such as dimethyl carbonate (DMC), diethyl carbonate (DEC), methylethyl carbonate (MEC), ethylmethyl carbonate (EMC), ethylene carbonate (EC), propylene carbonate (PC), and the like; alcohol-based solvents such as ethyl alcohol, isopropyl alcohol, and the like; nitriles such as R—CN (R represents a C2 to C20 hydrocarbon group having a linear, branched or cyclic structure, and may contain a double-bonded aromatic ring or an ether bond), and the like; amides such as dimethylformamide, and the like; dioxolanes such as 1,3-dioxolane, and the like; or sulfolanes may be used as the organic solvent. Among theses, a carbonate-based solvent is preferred, and a mixture of a cyclic carbonate (e.g., ethylene carbonate, propylene carbonate, and the like) having high ion conductivity and high dielectric permittivity and a low-viscosity linear carbonate-based compound (e.g., ethylmethyl carbonate, dimethyl carbonate, diethyl carbonate, and the like), which may enhance the charge/discharge performance of the battery, is more preferred. In this case, when a mixture of a cyclic carbonate and a chain-like carbonate which are mixed at a volume ratio of approximately 1:1 to approximately 1:9 is used, the performance of the electrolyte may be excellently expressed.

The lithium salt may be used without particular limitation as long as the lithium salt is a compound capable of providing lithium ions used in the lithium secondary battery. Specifically, the lithium salt may, for example, lithium salts such as LiCl, LiBr, LiI, $LiClOO_4$, $LiBF_4$, $LiBoCl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, (CF SO$_2$)$_2$NLi, (FSO$_2$)$_2$NLi, chloroborane lithium, lower aliphatic lithium carboxylate, 4-phenyl lithium borate, lithium imide, and the like. The lithium salt is desirably used in a concentration range of 0.1 to 2.0 M. When the concentration of the lithium salt falls within this concentration range, the electrolyte may have suitable conductivity and viscosity, thereby exhibiting excellent electrolyte performance and effectively promoting migration of lithium ions.

In addition to the components of the electrolyte, the electrolyte may, for example, further include one or more additives selected from additives, for example, halo-alkylene carbonate-based compounds such as difluoroethylene carbonate, and the like, pyridine, triethyl phosphite, triethanolamine, cyclic ether, ethylene diamine, n-glyme, triamide hexaphosphate, nitrobenzene derivative, sulfur, a quinoneimine dye, N-substituted oxazolidinone, N,N-substituted imidazolidine, ethylene glycol dialkyl ether, an ammonium salt, pyrrole, 2-methoxy ethanol, aluminium trichloride, and the like in order to improve lifespan characteristics of the battery, inhibit a decrease in capacity of the battery, and improve discharge capacity of the battery. In this case, the additives may be included at a content of 0.1 to 5% by weight, based on the total weight of the electrolyte.

Also, the electrolyte further includes an inorganic solid electrolyte or an organic solid electrolyte. The inorganic solid electrolyte is a ceramic-based material. In this case, a crystalline or amorphous material may be used as the inorganic solid electrolyte, and inorganic solid electrolytes such as thio-LISICON (Li$_{3.25}$Ge$_{0.25}$P$_{0.75}$S$_4$), Li$_2$S—SiS$_2$, LiI—Li$_2$S—SiS$_2$, LiI—Li$_2$S—P$_2$S$_5$, LiI—Li$_2$S—P$_2$O$_5$, LiI—Li$_3$PO$_4$—P$_2$S$_5$, Li$_2$S—P$_2$S$_5$, Li$_3$PS$_4$, Li$_7$P$_3$Sl, Li$_2$O—B$_2$O$_3$, Li$_2$O—B$_2$O$_3$—P$_2$O$_5$, Li$_2$O—V$_2$O$_5$—SiO$_2$, Li$_2$O—B$_2$O$_3$, Li$_3$PO$_4$, Li$_2$O—Li$_2$WO$_4$—B$_2$O$_3$, LiPON, LiBON, Li$_2$O—SiO$_2$, LiI, Li$_3$N, LisLa$_3$Ta$_2$O$_{12}$, Li$_7$La$_3$Zr$_2$O$_{12}$, Li$_6$BaLa$_2$Ta$_2$O$_{12}$, Li$_3$PO$_{(4-3/2w)}$N$_w$ (w is w<1), Li$_{3.6}$Si$_{0.6}$P$_{0.4}$O$_4$, and the like may also be used.

Examples of the organic solid electrolyte that may be used may include mixtures of the lithium salts with polymeric materials such as a polyethylene derivative, a polyethylene oxide derivative, a polypropylene oxide derivative, a phosphate ester polymer, polyagitation lysine, polyester sulfide, polyvinyl alcohol, polyvinylidene fluoride, and the like. In this case, the aforementioned components may be used alone or in combination of two or more.

The manufacture of the electrode for lithium secondary batteries according to the present invention is not particularly limited, and is performed according to a conventional process of manufacturing a battery.

As described above, because the lithium secondary battery including the positive electrode active material according to the present invention stably exhibits excellent discharge capacity, output characteristics, and a capacity retention rate, the lithium secondary battery may be used as a power source for one or more medium/large devices selected from portable devices such as cellular phones, laptop computers, digital cameras, and the like; power tools; electric vehicles including an electric vehicle (EV), a hybrid electric vehicle (HEV), and a plug-in hybrid electric vehicle (PHEV); or energy storage systems.

MODE FOR INVENTION

Hereinafter, embodiments of the present invention will be described so that a person having ordinary skill in the related art to which the present invention belongs may put the present invention into practice. However, it should be understood that the present invention can be implemented in various different forms, and is not limited to the embodiments disclosed below.

EXAMPLES

PREPARATIVE EXAMPLE 1: PREPARATION OF LCO-BASED LITHIUM COMPLEX 21.6 g of LiCoO$_2$ powder, 2.4 g of LiOH powder, 2.1 g of LiCl powder, and 0.043 g of BaOH$_2$ powder were mixed in a reaction vessel to prepare a mixed powder in which a LiRAP precursor was mixed with an active material. 3 mL of H$_2$O was added to the mixed powder to prepare a mixture in a gel phase.

Thereafter, the mixture was heat-treated under an oxygen atmosphere for 2 hours or more in a 240° C. autoclave, and then dried at the same temperature for approximately an hour to prepare a LCO-based lithium complex in which a LCO-based core (LiCoO$_2$) was coated with Li$_{2.99}$Ba$_{0.005}$ClO.

Preparative Example 2: Preparation of LCO-Based Lithium Complex 6.528 g of LiNO$_3$ powder, 0.048 g of LiF powder, and 0.46 g of Ba(CH$_3$COO)$_2$ powder were mixed in 100 mL of HNO$_3$ (0.1 M), and then reacted at room temperature for 12 hours in a reaction vessel. After the reaction, the reaction mixture was dried using a rotary evaporator and an electric oven. The dried powder was calcined at 900° C. for 3 days, and then cooled to room temperature at a rate of 3° C./min. The synthesized powder was washed several times with distilled water to remove unreacted materials, and re-calcined at 600° C. for an hour in the air. The synthesized material was hand-mixed with 21.6 g of LiCoO$_2$ powder and 2.1 g of LiC powder to prepare a ground mixed powder. 3 mL of H$_2$O was added to the mixed powder to prepare a mixture in a gel phase. Thereafter, the mixture was heat-treated under an oxygen atmosphere for 2 hours or more in a 600° C. autoclave, and then dried at the same temperature for approximately an hour to prepare a LCO-based lithium complex in which a LCO-based core (LiCoO$_2$) was coated with LiI 889Ba$_{0.037}$ClO$_{0.963}$F$_{0.037}$.

Experimental Example 1: Analysis of LCO-Based Lithium Complex

Elemental mapping of the LCO-based lithium complex prepared in Preparative Example 1 was performed using a scanning electron microscope. The results are shown in FIGS. 2 to 4.

FIGS. 2 to 4 are scanning electron microscope images of the LCO-based lithium complex, a Cl element, and a Co element, respectively. Referring to FIGS. 2 to 4, it can be seen that the LiCoO$_2$ was uniformly coated with Li$_{2.99}$Ba$_{0.005}$ClO because the Co and Cl elements were distributed on the entire surface of the LCO-based lithium complex.

Example 1: Manufacture of Lithium Secondary Battery

A positive electrode was manufactured using the LCO-based lithium complex prepared in Preparative Example 1 as the positive electrode active material, and a lithium secondary battery including the positive electrode was then manufactured.

The LCO-based lithium complex prepared in Preparative Example 1, a conductive material (carbon black), and a PVdF binder were mixed in an N-methylpyrrolidone solvent at a weight ratio of 90:5:5 to prepare a composition (viscosity: 5,000 mPa·s) for forming a positive electrode, and an aluminum current collector was coated with the composition. Thereafter, the aluminum current collector was dried and rolled to manufacture a positive electrode.

Also, a Li metal having a thickness of 20 m, to which a copper current collector was attached to manufacture a negative electrode, was used as the negative electrode.

A porous polyethylene separator was interposed between the positive and negative electrodes thus manufactured to prepare an electrode assembly, and the electrode assembly was disposed inside a case. Thereafter, an electrolyte was injected into the case to manufacture a lithium secondary battery. In this case, the electrolyte was prepared by dissolving a 1 M concentration of lithium bis-trifluoromethanesulfonimide (LiTFSI) in a dimethoxyethane (DME) organic solvent.

Example 2: Manufacture of Lithium Secondary Battery

A lithium secondary battery was manufactured in the same manner as in Example 1, except that the LCO-based lithium complex prepared in Preparative Example 2 was used as the positive electrode active material instead of the LCO-based lithium complex prepared in Preparative Example 1.

Comparative Example 1: Manufacture of Lithium Secondary Battery

A lithium secondary battery was manufactured in the same manner as in Example 1, except that $LiCoO_2$ (average particle diameter: 12 μm) was used as the positive electrode active material.

Experimental Example 2: Evaluation of Battery Performance

The battery characteristics of the lithium secondary batteries prepared in Example 1 and Comparative Example 1 were evaluated according to the following method.

Each of the lithium secondary batteries thus manufactured was charged and discharged 50 times at room temperature (25° C.) and a drive voltage of 4.25 V under 0.2C/0.2C conditions, and the number of charge/discharge cycles when a capacity retention rate of the battery reached 80% with respect to the initial capacity was determined. The results are listed in the following Table 1.

TABLE 1

| | Positive electrode active material | Initial discharge capacity (once) | Cycles to reach 80% capacity retention rate* |
|---|---|---|---|
| Example 1 | $Li_{2.99}Ba_{0.005}ClO$-coated LCO | 151 mAh/g | 32 |
| Example 2 | $Li_{1.889}Ba_{0.037}ClO_{0.963}F_{0.037}$-coated LCO | 151 mAh/g | 33 |
| Comparative Example 1 | $LiCoO_2$ | 151 mAh/g | 22 |

*Cycles with respect to the initial capacity at room temperature (25° C.)

Looking at Table 1, it can be seen that the batteries of Example 1 and Comparative Example 1 had the same initial discharge capacity, but had significantly different capacity retention rates.

While the present invention has been shown and described with reference to preferred embodiments thereof, it will be understood by those skilled in the art to which the present invention belongs that various changes and modifications in form and details may be made therein without departing from the scope of the present invention. Therefore, the scope of the invention is defined not by the detailed description of the invention but by the appended claims, and all differences within the scope will be construed as being included in the present invention.

[Brief Description of Parts in the Drawings]

10: LCO-based lithium complex
1: core   3: shell

The invention claimed is:

1. An LCO-based lithium complex comprising a coating layer and a core, wherein the coating layer comprises a lithium-rich antiperovskite (LiRAP) compound, wherein the core comprises LCO-based particles; wherein the coating layer is applied onto the core; and
wherein the LCO-based particles comprise one or more of the following chemical compounds:
(1) $LiCoO_2$
(2) $Li_{1-a}CoO_2$ (0<a<1)
(4) $LiMn_{1-d}O_2$ (0≤d<1)
(5) $LiMn_{2-e}Co_eO_4$ (0<e<2)
(6) $LiNi_{1-f}Co_fO_2$ (0≤f<1)
(7) $LiNi_{1-g-h}CoM_hO_2$ (M=Al, Sr, Mg, or La, 0≤g≤1, 0≤h≤1, and 0≤g+h≤1)
(8) $Li(Ni_jCo_kMn_l)O_2$ (0<j<1, 0<k<1, 0<l<1, and j+k+l=1)
(9) $Li(Ni_mCo_nMn_o)O_4$ (0<m<2, 0<n<2, 0<o<2, and m+n+o=2)
(W) $Li_{1+p}Ni_qCo_rMe_sO_2$ (Me=SC, Y, La, Rh, Ir, Al, Ga, In, or Ta, 0.02≤p≤0.2, 0.4≤q≤0.58, 0.4≤r≤0.5, 0.0≤s≤0.1, and p+q+r+s=1)
(11) $Li_tNi_uMn_vCo_wO_2$ (1≤t≤1.2, u=1−v−w, 0<v<1, 0<w<1, u>v, w=nv, or v=nw, and n>1).

2. The LCO-based lithium complex of claim 1, wherein the LCO-based particles have an average particle diameter of 1 to 1,000 nm.

3. The LCO-based lithium complex of claim 1, wherein the LCO-based particles has a surface continuously or discontinuously coated with one or more lithium-reactive elements selected from the group consisting of Ti, W, Zr, Mn, Mg, P, Ni, Al, Sn, V, Cr, and Mo.

4. The LCO-based lithium complex of claim 1, wherein the lithium-rich antiperovskite compound comprises one or more selected from the following chemical compounds:

(12) $Li_3OCl$

(13) $Li_{(3-a)}M_{a/2}OHal$ (M=Mn, Ca, Ba, or Sr, Hal=F, Cl, Br, or I, and 0<a<3)

(14) $Li_{(3-b)}N_{(b/3)}OHal$ (N=a trivalent metal, Hal=F, Cl, Br, or I, and 0≤b≤3)

(15) $LiOX_cY_{(1-c)}$, (X and Y are different halides, and 0≤c≤1)

(16) $Li_{3-d}ClO_{1-d}Hal_d$ (Hal=F, Cl, Br, or I, and 0<d<1)

(17) $Li_{3-e-f}A_eO_{1-f}Hal_fCl$ (A=Na, or K, Hal=F, Cl, Br, or I, 0<e<2, and 0<f<1)

(18) $Li_{3-2-g-h}M_gO_{1-h}Hal_hCl$ (M=Mg, Mn, Ca, Ba, or Sr, Hal=F, Cl, Br, or I, 0<g<1, and 0<h<1).

5. The LCO-based lithium complex of claim 1, wherein the lithium-rich antiperovskite compound has an ion conductivity of 10 to $10^{-10}$ S/cm.

6. The LCO-based lithium complex of claim 1, wherein the coating layer has a content of the lithium-rich antiperovskite compound that is less than or equal to 20% by weight, based on a total of 100% by weight of the complex.

7. The LCO-based lithium complex of claim 1, wherein the coating layer has a thickness of 1 nm to 100 μm.

8. A method of preparing the LCO-based lithium complex defined in claim 1, comprising:
preparing a mixed solution of a lithium-rich antiperovskite compound precursor;
mixing the mixed solution with LCO-based particles; and
forming a coating layer of a lithium-rich antiperovskite compound on the LCO-based particles by means of a sol-gel process and heat treatment.

9. A positive electrode active material for lithium secondary batteries comprising the LCO-based lithium complex defined in claim 1.

10. A lithium secondary battery comprising a positive electrode, a negative electrode, and an electrolyte interposed between the positive and negative electrodes,
wherein the positive electrode comprises the positive electrode active material defined in claim 9.

* * * * *